(12) United States Patent
Balijepalli et al.

(10) Patent No.: US 9,000,057 B2
(45) Date of Patent: Apr. 7, 2015

(54) ALDEHYDE ABATEMENT WITH POROUS AMINE FUNCTIONAL RESINS

(71) Applicants: Dow Global Technologies LLC, Midland, MI (US); Rohm and Haas Company, Philadelphia, PA (US)

(72) Inventors: Sudhakar Balijepalli, Midland, MI (US); Paul Doll, North Wales, PA (US); Alvin M. Maurice, Lansdale, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/061,226

(22) Filed: Oct. 23, 2013

(65) Prior Publication Data

US 2014/0121288 A1 May 1, 2014

Related U.S. Application Data

(60) Provisional application No. 61/718,227, filed on Oct. 25, 2012.

(51) Int. Cl.
C09D 125/06 (2006.01)
C09D 133/02 (2006.01)
C09D 5/00 (2006.01)

(52) U.S. Cl.
CPC ............ *C09D 125/06* (2013.01); *C09D 133/02* (2013.01); *C09D 5/00* (2013.01)

(58) Field of Classification Search
CPC .................................. C09D 133/02; C09D 5/00
USPC ............................................................ 521/28, 32
See application file for complete search history.

(56) References Cited

U.S. PATENT DOCUMENTS

| 3,494,878 A | 2/1970 | Harren et al. |
| 4,374,872 A | 2/1983 | Eckert et al. |
| 5,922,777 A | 7/1999 | Van Rheenen |
| 6,280,913 B1 | 8/2001 | Irving et al. |
| 6,815,466 B2 | 11/2004 | Van Rheenen |
| 2002/0146384 A1 | 10/2002 | Hughes et al. |
| 2006/0122330 A1* | 6/2006 | Wu et al. .......................... 525/127 |
| 2006/0135681 A1 | 6/2006 | Cavanaugh |
| 2011/0055073 A1 | 3/2011 | Rosko |
| 2012/0148858 A1* | 6/2012 | Wu ............................ 428/537.1 |

FOREIGN PATENT DOCUMENTS

| EP | 1112780 A2 | 7/2001 |
| EP | 2169080 B1 | 4/2011 |
| EP | 2508174 A1 * | 10/2012 |

* cited by examiner

*Primary Examiner* — Michael M Bernshteyn
(74) *Attorney, Agent, or Firm* — Reid S. Willis

(57) ABSTRACT

The present invention addresses a need in the art by providing a composition comprising an aqueous dispersion of a binder and porous ion exchange resin particles that are functionalized with primary amine groups or secondary amine groups or both. The composition of the present invention provides an efficient way of removing aldehydes from or in the vicinity of a coating prepared from the composition.

10 Claims, No Drawings

ALDEHYDE ABATEMENT WITH POROUS AMINE FUNCTIONAL RESINS

BACKGROUND OF THE INVENTION

The present invention relates to a coating composition containing an amine functionalized ion exchange resin, which composition is useful for abatement of aldehydes.

As standards for aldehyde emissions become more stringent, the need for abatement of aldehydes in aldehyde generating formulations such as formaldehyde based adhesive or coating compositions becomes more urgent. US 2012/0148858 discloses a method of reducing aldehydes on or near a substrate with a coatings formulation containing an amino-functionalized compound such as a low molecular weight (<1000 g/mol) primary amine. Although abatement does indeed occur, the solution to the problem is hampered because the amine acts as both a base and a nucleophile. Mechanistically, abatement occurs through the nucleophilic reaction of the amine and the aldehyde. However, as a base, the amine, especially a polyamine, is free to react with acidic functionality in the binder, which can result in flocculation of the formulation. Moreover, the amount of amine functionalized compound required to abate the aldehyde is increased because some portion of the amine will be diverted to the acid. Also, the increased load of the amine increases the portion of water-soluble material in the formulation, which, in turn, adversely affects the properties of the formulation. Finally, the amine can impart malodor and increase the VOC content of the coating and is undesirable for these reasons as well. Accordingly, it would be desirable to find a more efficient and effective way to abate aldehydes in the vicinity of coatings formulations.

SUMMARY OF THE INVENTION

The present invention addresses a need in the art by providing a composition comprising an aqueous dispersion of a binder and porous ion exchange resin particles that are functionalized with primary amine groups or secondary amine groups or both. The composition of the present invention provides an efficient way of removing aldehydes from or in the vicinity of a coating prepared from the composition.

DETAILED DESCRIPTION OF THE INVENTION

The present invention is a composition comprising an aqueous dispersion of a binder and porous ion exchange resin particles that are functionalized with primary amine groups or secondary amine groups or both. The binder is not limiting and can be any binder suitable for a coatings formulation. Examples of suitable binders include aqueous dispersions of acrylic, styrene-acrylic, vinyl ester-acrylic, vinyl ester-ethylene, silicone, urethane, vinylidene halide, and vinyl halide polymer particles.

The porous ion exchange resin is a water-insoluble resin functionalized with primary or secondary amine groups, preferably primary amine groups such benzylamine groups. The resin is preferably a macroporous polystyrene resin crosslinked with a suitable crosslinker such as divinyl benzene. The resin particles are characterized by having a volume average diameter preferably in the range of from 0.1 µm to 2 mm. The amine functionalized ion exchange resins are generally commercially available as larger particles with a volume average diameter in the range of 0.5 mm to 2 mm and, if a textured coating is desired, the resins can be used as is. However, it is preferred to reduce the size of the larger particles, for example, by milling in the presence of a dispersant, to a volume average diameter in the range of from 0.1 µm, more preferably from 0.5 µm, and most preferably from 5 µm, to 200 µm, more preferably to 100 µm, and most preferably to 50 µm.

The amount of amine functionalized ion exchange resin that incorporated into the coating composition depends on several factors including the targeted level aldehyde to be abated, the capacity of the resin, and the extent to which the resin's amine functionality is neutralized by other coating components such as acid functional dispersants, surfactants, and thickeners. It is desirable to use ion exchange resins with a high degree of surface area to optimize the level of amine groups per mass or volume of the resin. A dispersant may be used to minimize grit and settling of the porous resin particles; moreover, the dispersant may be further selected so as not to penetrate into the resin. Preferably the dispersant, which is preferably a salt of a polyacrylic acid, has a weight average molecular weight ($M_w$) in the range of 4000 to 80,000 Daltons.

Accordingly, one skilled in the art can maximize the coatings capacity by selecting a high surface area resin with pores large enough to allow penetration of the aldehyde and then optionally grinding this resin to the desired size. This amino-functional ion exchange resin slurry can then be incorporated into a coating in an amount required to provide abatement capacity of the targeted level of aldehydes. The BET surface area of the particles is preferably in the range of from 10 $m^2/g$, more preferably from 30 $m^2/g$, to 800 $m^2/g$, more preferably to 500 $m^2/g$, more preferably to 100 70 $m^2/g$ and most preferably to 70 $m^2/g$. The average pore diameter of the resin particles is preferably from 10 nm, more preferably from 20 nm, to 100 nm, more preferably to 50 nm, and the pore volume is preferably in the range of from 0.1 $cm^3/g$, more preferably from 0.2 $cm^3/g$, to 1 $cm^3/g$, more preferably to 0.5 $cm^3/g$.

The amount of amino-functionalized ion exchange resin is somewhat dependent on the volume capacity of the functionalized amine on the resin. Preferably, the volume capacity is in the range of from 0.1 eq/L, more preferably from 0.5 eq/L, most preferably from 1.0 eq/L, to 10 eq/L, more preferably to 5 eq/L, and most preferably to 3 eq/L. Preferably, the solids weight-to-weight ratio of ion exchange resin to binder is from 0.001:100, more preferably from 0.01:100, and most preferably from 0.2:100, to 5:100, more preferably to 2:100, and most preferably to 1:100.

A commercial example of a suitable macroporous (macroreticular) amino-functionalized ion exchange resin is Lewatit VP OC 1065 Resin, which is a macroreticular divinylbenzene crosslinked polystyrene resin with benzyl-amine groups situated throughout the porous surfaces of the resin particles. This particle commercial resin has a BET surface area of approximately 50 $m^2/g$, with a pore volume of approximately 0.27 $cm^3/g$ and an average pore size diameter of 25 nm.

The composition of the present invention may also include additional materials such as solvents; pigments such as unencapsulated or partially or completely encapsulated $TiO_2$; fillers; defoamers; surfactants; dispersants; thickeners; coalescents; colorants; preservatives; flow agents; leveling agents; and neutralizers. A surface coated with the composition of the present invention provides an efficient way of abating aldehydes from or in the vicinity of the coating without the drawbacks described hereinabove.

EXAMPLES

The following examples are for illustrative purposes only and are not intended to limit the scope of the invention.

The volume capacities of a macroreticular benzyl amine functionalized resin, Lewatit VP OC 1065 Porous Resin, is about 2 eq/L. The volume of a macroreticular quaternary ammonium chloride functionalized resin used in the comparative examples, AMBERLITE™ IRA 900 Cl Porous Resin (A Trademark of The Dow Chemical Company or its Affiliates) is about 1 eq/L.

A. Preparation of Slurries of Porous Resins

The porous resins were ground to <100 μm. Water and ACUMER™ 9300 Acrylic Dispersant (A Trademark of The Dow Chemical Company or its Affiliates) were then weighed into six separate vials. After capping and swirling for 30 s to disperse the homopolymer dispersant, ground porous resin (1.25 g) was added to each dispersion. The vials were capped and sonicated for 60 min using a Bransonic 1210 sonicator to disperse the porous resin particles. Table 1 illustrates the composition of the six slurries.

Intermediate Examples 1-3 and Intermediate Comparative Examples 1-3

Preparation of Coating Compositions

TABLE 1

Composition of Ion Exchange Resin Slurries

| Intermed. | Ion Exchange Resin | Dispersant (g) | Water (g) | Resin (g) |
|---|---|---|---|---|
| Comp. 1 | Quat Functionalized | 0.13 | 3.62 | 1.25 |
| Comp. 2 | Quat Functionalized | 0.06 | 3.69 | 1.25 |
| Comp. 3 | Quat Functionalized | 0.013 | 3.737 | 1.25 |
| Ex. 1 | Benzyl Amine Functionalized | 0.13 | 3.62 | 1.25 |
| Ex. 2 | Benzyl Amine Functionalized | 0.06 | 3.69 | 1.25 |
| Ex. 3 | Benzyl Amine Functionalized | 0.013 | 3.737 | 1.25 |

B. Preparation of Clear Coating with Post Addition of Slurries

In a 1-quart (~0.95-L) container a control clear coating was prepared by adding one at a time with stirring to the Binder (508.58 g, 58.25 weight percent butyl acrylate/40.25 weight percent methyl methacrylate/1.5 weight percent methacrylic acid; 48.2% solids, pH 8.8, particle size of 108 nm), Aerosol OT 75 PG surfactant (2.54 g), Foamstar A-34 defoamer (0.51 g), water (299.02 g), ammonia (0.55 g, 28% aq), and ACRYSOL TT 935 Rheology Modifier (30.03 g, diluted to 10% aq). Components were added one at a time with mixing. The pH of the coating was 8.75, and the Stormer viscosity 100 KU.

C. Preparation of Clear Coating/Slurry Composition

After sitting one day to equilibrate, a portion of the clear coating composition described in step B (100.0 g) was weighed out into seven separate containers. The contents of each container were mixed at 1000 rpm while adding 2.5 g of slurry to each formulation except one (the control).

Abatement Testing

Each of the clear formulations were drawn-down on a 4"×4" aluminum panel with a 7-mil gap Teflon bar and set to dry for 4 days inside a chamber containing activated carbon; the chambers were controlled at a relative humidity of 50% and at a temperature of 75° F. (24° C.). A corner of a 10-L Tedlar bag was cut off and a sample was inserted into the bag. The bag was then sealed using a heat-sealing device, then inflated with 8 L of air. Using a 10-μL syringe, a known amount of formalin solution was injected to achieve a specified concentration of gaseous formaldehyde inside the bag (typically either 10 ppmv or 100 ppmv). Concurrently, an empty control bag containing no coated panel was also injected with an equal amount of formalin standard solution. At a specified sampling time (3 or 7 days), a known volume of headspace from the bags was aspirated into a gas chromatograph equipped with a helium ion detector for detection and measurement of formaldehyde. The percent abated was then calculated by subtracting the amount of formaldehyde measured in the sample bag from the amount in the control bag, then dividing by the amount measured in the control bag and multiplying by 100. Comparison to a control bag helped to account for other factors such as decomposition or sorption to the surfaces of the bag. Table 2 shows the abatement of formaldehyde ($CH_2O$) and acetaldehyde ($CH_3CHO$) for the compositions containing slurry the various slurry intermediates (Comparative Examples 1 to 3 and Examples 1 to 3) and the control, which contained no ion exchange resin.

TABLE 2

Abatement of Formaldehyde

| | Abatement Time | | |
|---|---|---|---|
| | 3 Days | 7 Days Aldehyde | 3 Days |
| | $CH_2O$ | $CH_2O$ | $CH_3CHO$ |
| | ppm Aldehyde Injected | | |
| | 10 ppm | 100 ppm | 10 ppm |
| Comp. 1 abatement (%) | 13 | −10 | −5 |
| Comp. 2 abatement (%) | 4 | −3 | −11 |
| Comp. 3 abatement (%) | 100 | 4 | 2 |
| Ex. 1 abatement (%) | 88 | 58 | 16 |
| Ex. 2 abatement (%) | 83 | 62 | 17 |
| Ex. 3 abatement (%) | 90 | 59 | 18 |
| Control abatement (%) | 13 | 4 | 5 |

The results show that the composition containing quaternary ammonium chloride functionalized ion exchange resin performed no better than the control except where the formulation contained a minimal amount of the dispersant. The use of such low amounts of dispersant, however, is impractical because the capacity for abatement is severely impacted, as evidenced by the poor abatement for the comparative example 3 coating at 100 ppm formaldehyde.

On the other hand, the performance of the coating derived from the formulation containing the benzyl amine functionalized ion exchange resin is observed to be independent of dispersant concentration. Though not bound by theory, it is believed that the results arise from the high degree of acid functionality from the dispersant reacting with any residual level of nucleophilic amines present on the surface of the quaternary functionalized ion exchange resin, which results in the neutralization of most of the available amine groups. Consequently, the ion exchange resin functionalized with unquaternized free base present in the interior can react with the significant levels of aldehydes (i.e., act as a nucleophile) without increasing the water sensitivity of coated formulation (i.e., not act as a base.)

The invention claimed is:

1. A composition comprising an aqueous dispersion of a binder and porous ion exchange resin particles that are functionalized with primary amine groups or secondary amine groups or both.

2. The composition of claim 1 wherein the porous ion exchange resin particles are macroreticular particles of polystyrene crosslinked with divinyl benzene.

3. The composition of claim 2 wherein the solids weight-to-weight ratio of the ion exchange resin particles to the binder is from 0.001:100 to 5:100; and the volume capacity of the ion exchange resin particles is from 0.1 eq/L to 10 eq/L.

4. The composition of claim 3 wherein BET surface area of the ion exchange resin particles is from 10 $m^2/g$ to 800 $m^2/g$; and the average pore diameter of the ion exchange resin particles is from 10 nm to 100 nm.

5. The composition of claim 4 wherein the volume average diameter of the ion exchange resin particles is in the range of from 0.5 μm to 50 μm.

6. The composition of claim 5 wherein the ion exchange resin is functionalized with primary amine groups.

7. The composition of claim 5 wherein the ion exchange resin is functionalized with benzyl amine groups.

8. The composition of claim 1 wherein the binder is an aqueous dispersion of acrylic, styrene-acrylic, vinyl ester-acrylic, vinyl ester-ethylene, silicone, urethane, vinylidene halide, or vinyl halide polymer particles.

9. The composition of claim 1 which further comprises a dispersant which is a salt of a polyacrylic acid having an $M_w$ in the range of from 4000 to 80,000 Daltons.

10. The composition of claim 1 which further includes at least one material selected from the group consisting of solvents, pigments, fillers, defoamers, surfactants, dispersants, thickeners, coalescents, colorants, preservatives, flow agents, leveling agents, and neutralizers.

* * * * *